May 16, 1933.   L. G. SIMJIAN   1,908,869
POSE REFLECTING APPARATUS
Filed April 7, 1931   2 Sheets-Sheet 1
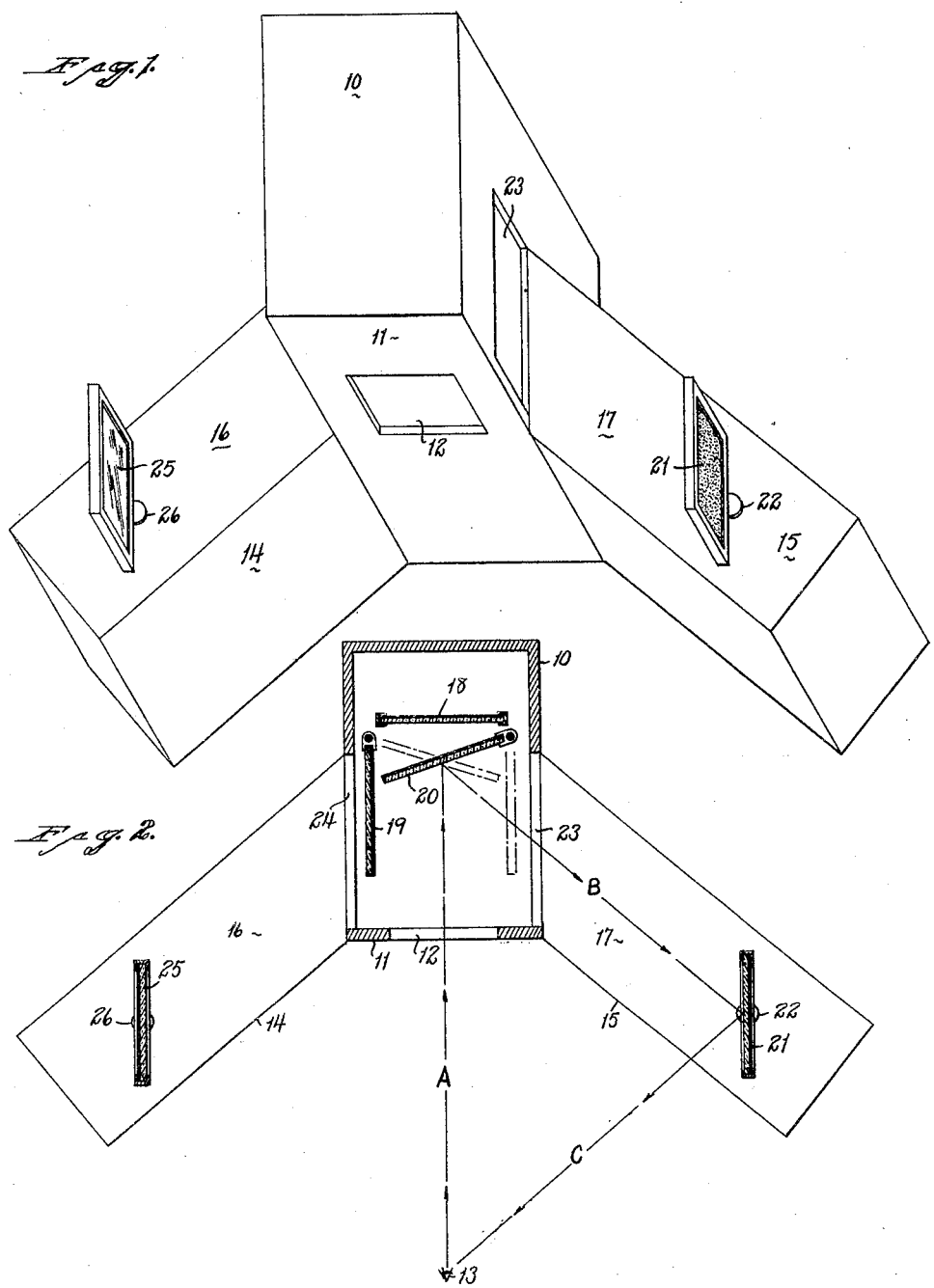

May 16, 1933.  L. G. SIMJIAN  1,908,869
POSE REFLECTING APPARATUS
Filed April 7, 1931  2 Sheets-Sheet 2
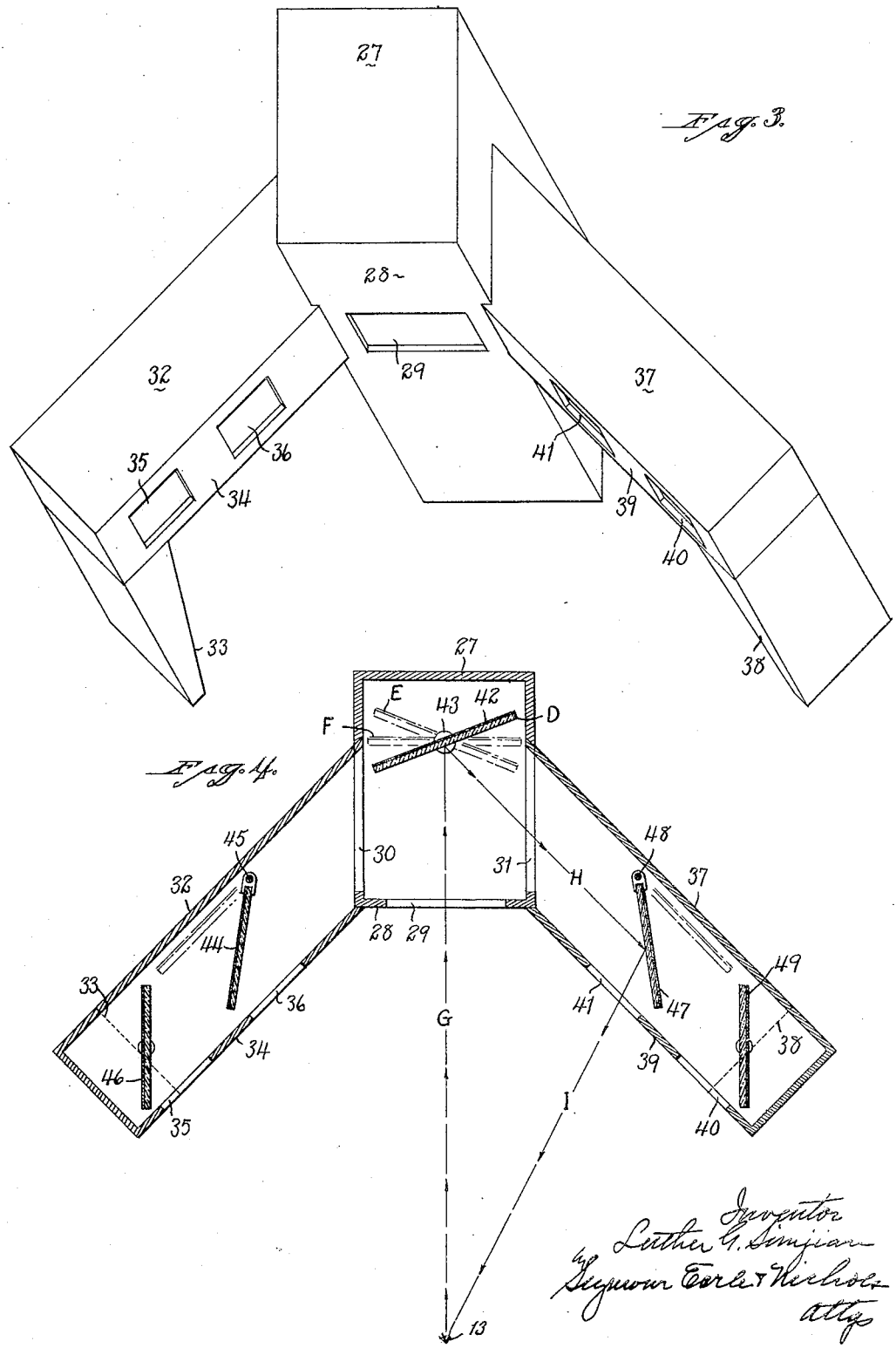

Patented May 16, 1933

1,908,869

UNITED STATES PATENT OFFICE

LUTHER G. SIMJIAN, OF NEW HAVEN, CONNECTICUT

POSE-REFLECTING APPARATUS

Application filed April 7, 1931. Serial No. 528,274.

This invention relates to an improvement in pose-reflecting apparatus primarily designed for use in connection with photographic apparatus to enable a subject to assume a desired pose before being photographed, though not so limited.

The main object of my present invention is to provide an apparatus of the character referred to which will reflect back to the poser an image of himself of superior clarity and definition.

A further object of my invention is to provide an apparatus of the character referred to which will reduce to a minimum the strain upon the eyes of a poser in observing his image which is indirectly reflected to him.

With the above and other objects in view as will appear from the following, my invention consists in a pose-reflecting apparatus characterized by the combination with an image-deflecting mirror or member positioned to receive and deflect an image of a poser forwardly and to one side; of a pose-reflecting mirror or member located forwardly and to one side of the said image-deflecting mirror in position to receive the poser's image therefrom and to reflect the same to the poser; and a mask interposed in the angular light-path thus provided for laterally circumscribing the same which extends from the poser to the said image-deflecting member, from thence to the pose-reflecting member and from the latter to the eyes of the poser; whereby the reflection of himself observed by the poser possesses clarity, depth and definition.

My invention further consists in a pose-reflecting apparatus characterized as above and having certain other combinations and arrangements of parts as will be hereinafter described and particularly recited in the claims.

In the accompanying drawings:

Fig. 1 is a perspective view of one form which a pose-reflecting apparatus embodying my invention may assume;

Fig. 2 is a view thereof in horizontal section;

Fig. 3 is a perspective view of another form which a pose-reflecting apparatus embodying my invention may assume; and Fig. 4 is a view thereof in horizontal section.

The particular embodiment of my invention herein chosen for illustration in Figs. 1 and 2 consists, as shown, of a central upstanding rectangular cabinet designated as a whole by the numeral 10, the front wall 11 of which is provided with an aperture 12 and acts, as will be hereinafter described, as a mask for imparting clarity, depth and definition to the reflected image of a poser represented as positioned at 13.

Diverging outward from the respective opposite sides of the central cabinet 10 are a pair of complementary wing-cabinets 14 and 15, the respective upper surfaces 16 and 17 of which are arranged in a plane slightly below the lower edge of the aperture 12 and provide platforms for the support of pose-reflecting mirrors as will shortly be described.

Located directly back of the front wall 11 of the central cabinet 10 in line with the aperture 12 therein are a group of three mirrors respectively consisting of a central pose-reflecting mirror 18 and a pair of complementary image-deflecting mirrors 19 and 20 respectively mounted for pivotal movement adjacent the opposite sides of the said central pose-reflecting mirror 18 and each adapted to be swung in front thereof, as indicated in Fig. 2 and for the purpose as will hereinafter appear.

Cooperating with the image-deflecting mirror 20 is a pose-reflecting mirror 21 mounted upon a standard 22 resting upon the upper surface 17 of the wing-cabinet 15 in position to reflect to the poser 13 the image which has traveled from himself along the line A to the said image-deflecting mirror 20 from the latter along the line B forwardly and outwardly through an opening 23 formed in the side of the central cabinet 10, to the pose-reflecting mirror 21, thence back to the poser along the line C.

Thus, when the poser represented at 13 has turned his head so as to gaze directly at the pose-reflecting mirror 21, an image of the left side of his face will impinge upon the image-deflecting mirror 20 and be thereby deflected obliquely forwardly and outwardly to the pose-reflecting mirror 21, thence back to the poser, who is thus enabled to observe in the said mirror 21 a profile, or semi-profile, view of his face and such other portions of his body as may be desired.

Similarly, when the image-deflecting mirror 19 is swung into the position in which it is indicated by broken lines in Fig. 2, the image received thereby will be deflected obliquely forward and to one side through an opening 24 in the side of the cabinet 10 for impingement upon a pose-reflecting mirror 25 having a standard 26 and mounted upon the platform 16 provided by the upper surface of the wing-cabinet 14. The image thus received by the mirror 25 will be reflected back to the poser in the same manner as that described in connection with the mirrors 20 and 21.

The image received and deflected by the mirror 20 or by the mirror 19, as the case may be, is laterally circumscribed and defined in its lateral bounds with a portrait-like effect by that portion of the front wall 11 of the cabinet 10 immediately surrounding the aperture 12 therein, which functions as a mask and not only defines and, in a sense, frames the image to closely simulate a framed portrait, but markedly reduces the eye strain of the poser, due, probably, to its action in excluding stray light rays.

It is obvious, without further illustration, that if desired more than one pose-reflecting mirror may be mounted upon the respective platforms 16 and 17. The mirrors 18, 19 and 20 may be mounted in any approved manner, for instance, as more fully set forth in my Patent No. 1,830,770, dated November 10, 1931.

Should the poser desire to view a full-face reflection of himself, this may be accomplished by swinging both of the image-deflecting mirrors 19 and 20 so that they parallel with line A, in which position the central mirror 18 is exposed for the direct view of the poser through the aperture 12.

In Figs. 3 and 4 I have shown another form which a pose-reflecting apparatus embodying my invention may assume, which consists of a central cabinet 27 substantially corresponding to the cabinet 10 before referred to and, like the same, formed in its front wall 28 with an aperture 29 and in its respective opposite side walls with openings 30 and 31.

Registering with the opening 30 in the left side wall of the cabinet 10, as viewed in Figs. 3 and 4, and outwardly and forwardly diverging therefrom, is a horizontally-arranged box-like wing 32 supported at its outer end by a leg-structure 33 and providing a completely-enclosed channel for the light-beam, as will be hereinafter described, save for a pair of apertures formed in its front wall 34 and respectively designated for convenience of description as "profile" aperture 35 and "semi-profile" aperture 36.

Similarly registering with the opening 31 in the right hand side wall of the cabinet 27 and diverging obliquely forwardly and laterally therefrom is a wing 37 supported at its outer end upon a leg-structure 38 and, like the wing 32 before referred to, provided in its front wall 39 with a profile aperture 40 and a semi-profile aperture 41.

Located directly back of the aperture 29 in the cabinet 27 is a combined image-deflecting and pose-reflecting mirror 42 arranged in a vertical plane and mounted for angular adjustment in a horizontal plane upon a support 43 in any approved manner, such, for instance, as that shown in by Patent, No. 1,799,767, dated April 7, 1931.

Mounted within the wing 32 in substantial alignment with the semi-profile aperture 36 therein is a mirror which, for convenience of description, will be referred to as a semi-profile pose-reflecting mirror 44, which is mounted upon an upstanding shaft 45 for adjustment in a horizontal plane, so as to provide for its retirement into the position shown by broken lines in Fig. 4, to permit the light-beam, when desired, to reach a second mirror 46 also mounted in the wing 32 near the outer end thereof in alignment with the profile aperture 35 and characterized, for convenience of description, as a profile pose-reflecting mirror.

Similarly, the wing 37 has installed within it in alignment with its semi-profile aperture 41 a semi-profile pose-reflecting mirror 47, corresponding to the mirror 44 already referred to and like the same, mounted for swinging movement in a horizontal plane, as shown by broken lines in Fig. 4, upon a vertical shaft 48 into a clearance position to permit the light-beam to reach, if desired, a profile pose-reflecting mirror 49 located within the wing 37 and in alignment with the aperture 40 therein.

With the mirror 42 in the position in which it is shown by full lines in Fig. 4, which position may be designated, for convenience of description, as position D, let it be presumed that the poser is looking directly through the aperture 41 at the semi-profile mirror 47. There he will observe a reflection of this semi-profile, which will travel from his face to the mirror 42 along the line G, thence obliquely forwardly and to one side to the mirror 47 along the line H, and finally from the mirror 47 to the poser along the line I.

The image in traveling as just above described will be observed by the poser with a minimum of eye strain, due to the fact that the reflection will be laterally circumscribed or bounded by the walls of the aperture 41, through, if desired, the portion of the front wall 28 of the cabinet 27 immediately surrounding the aperture 29 therein may be caused to perform this function by correctly proportioning the said aperture, or both may cooperate as may also the side opening 31.

If the poser desires to view himself more in profile, the mirror 47 may be swung backward into the position in which it is shown by broken lines in Fig. 4 and the poser may then view his reflected pose from the mirror 49.

If the mirror 42 be turned into the position E (Fig. 4), the poser may observe his image in either of the mirrors 44 or 46 in the same manner as that above described for the mirrors 47 and 49.

Should the poser desire to view a full-face reflection of himself, he may do so by swinging the mirror 42 into position F (Fig. 4) and gazing straight forward through the aperture 29 to the said mirror, which will be laterally circumscribed and have definition and clarity imparted to it by the portions of the front wall 28 immediately surrounding the aperture 29 therein.

In the structure shown in Figs. 3 and 4 there is a marked advantage over that shown in Figs. 1 and 2 for the reason that the front wall 39 of the wing 37, in conjunction with the front wall 28 of the central cabinet, forms a continuous shield between the respective apertures and effectively prevents stray light-rays from causing the aberration of the reflected image.

Both of the particular embodiments of my invention herein chosen for illustration are characterized by the fact that the light-beam traveling in the triangular paths illustrated, is laterally circumscribed by the boundaries of one or the other of the apertures through which it passes (which may be of rectangular, oval or other desired form), by virtue of which fact the reflected image has imparted to it depth, definition and clarity to a marked degree, with the consequent lessening of eye strain.

By reference to the drawings, it will be noted that a given pose-reflecting member is, under operating conditions, positioned and focused with respect to its complementary image-deflecting member, so that the angular light-path provided becomes, in effect, a "closed-circuit" light-path inasmuch as the image picked up by the image-deflecting member is deflected back to substantially its point of origin. In other words, the reaches A and C of the light-paths of Fig. 2 intersect to form a "closed-circuit" at the point 13, as do also the reaches G and I of the light-path of Fig. 4.

It will be understood by those skilled in the art that my invention may assume varied physical forms without departing from my inventive concept, and I, therefore, do not limit myself to the specific embodiment herein chosen for illustration, but only as indicated in the appended claims.

I claim:

1. In a pose-reflecting apparatus, the combination with an image-deflecting member positioned to receive and deflect an image forwardly and to one side; of a pose-reflecting member in substantially-horizontal alignment with and located forwardly and to one side of the said image-deflecting member in position to receive the poser's image therefrom and deflect the same back to the poser; both of the said members being focused to provide a closed-circuit light-path; and a mask interposed in and laterally circumscribing the angular light-path which extends in a substantially-horizontal plane from the poser to the said image-deflecting member, from thence to the pose-reflecting member and from the latter to the eyes of the poser; whereby the reflection of himself observed by the poser possesses clarity, depth and definition.

2. In a pose-reflecting apparatus, the combination with an image-deflecting member positioned to receive and deflect an image forwardly and to one side; of a pose-reflecting member in substantially-horizontal alignment with and located forwardly and to one side of the said image-deflecting member in position to receive the poser's image therefrom and reflect the same back to the poser; both of the said members being focused to provide a closed-circuit light-path; and a mask interposed in and laterally circumscribing the angular light-path which extends in a substantially-horizontal plane from the poser to the said image-deflecting member, from thence to the pose-reflecting member and from the latter to the eyes of the poser, the said mask being positioned between the poser and the said image-deflecting member; whereby the reflection of himself observed by the poser possesses clarity, depth and definition.

3. In a pose-reflecting apparatus, the combination with an image-deflecting member positioned to receive and deflect an image forwardly and to one side; of a pose-reflecting member in substantially-horizontal alignment with and located forwardly and to one side of the said image-deflecting member in position to receive the poser's image therefrom and reflect the same back to the poser; both of the said members being focused to provide a closed-circuit light-path; and a mask interposed in and laterally circumscribing the angular light-path which extends in a substantially-horizontal plane from the poser to the said image-deflecting member, from thence to the pose-reflecting member and from the latter to the eyes of the poser, the said mask being interposed between the said pose-reflecting member and the poser; whereby the reflection of himself observed by the poser possesses clarity, depth and definition.

4. In a pose-reflecting apparatus, the combination with an image-reflecting member positioned to receive and deflect an image forwardly and to one side; of a pose-reflecting member located in substantially-horizontal alignment with and forwardly and to one side of the said image-deflecting member in position to receive the poser's image therefrom and reflect the same back to the poser; both of the said members being focused to provide a closed-circuit light-path; and a light-shield interposed between the poser and that portion of the light-path extending between the said image-deflecting member and the said pose-reflecting member.

5. In a pose-reflecting apparatus, the combination with an image-deflecting member positioned to receive and deflect an image forwardly and to one side; of a pose-reflecting member in substantially-horizontal alignment with and located forwardly and to one side of the said image-deflecting member in position to receive the poser's image therefrom and reflect the same back to the poser; both of the said members being focused to provide a closed-circuit light-path; a mask interposed in and laterally circumscribing the angular light-path which extends in a substantially-horizontal plane from the poser to the said image-deflecting member, from thence to the pose-reflecting member and from the latter to the eyes of the poser; whereby the reflection of himself observed by the poser possesses clarity, depth and definition; and a light-shield interposed between the poser and that portion of the light-path extending between the said image-deflecting member and the said pose-reflecting member.

6. In a pose-reflecting apparatus, the combination with an image-deflecting member positioned to receive and deflect an image forwardly and to one side; of a pose-reflecting member in substantially-horizontal alignment with and located forwardly and to one side of the said image-deflecting member in position to receive the poser's image therefrom and reflect the same back to the poser; both of the said members being focused to provide a closed-circuit light-path; a mask interposed in the light-path for laterally circumscribing the same directly between the poser and the said image-deflecting member; and a substantially-tubular light-tunnel extending between the said image-deflecting member and the said pose-reflecting member.

7. In a pose-reflecting apparatus, the combination with an image-deflecting member positioned to receive and deflect an image forwardly and to one side; of a pose-reflecting member in substantially-horizontal alignment with and located forwardly and to one side of the said image-deflecting member in position to receive the poser's image therefrom and reflect the same back to the poser; both of the said members being focused to provide a closed-circuit light-path; a mask interposed in the light-path for laterally circumscribing the same directly between the said pose-reflecting member and the poser; and a substantially-tubular light-tunnel extending between the said image-deflecting member and the said pose-reflecting member.

8. In a pose-reflecting apparatus, the combination with an image-deflecting member positioned to receive and deflect an image forwardly and to one side; of a pose-reflecting member in substantially-horizontal alignment with and located forwardly and to one side of the said image-deflecting member in position to receive the poser's image therefrom and reflect the same back to the poser; both of the said members being focused to provide a closed-circuit light-path; a pair of masks interposed in the light-path for laterally circumscribing the same and respectively positioned directly between the poser and the said image-deflecting member and the said pose-reflecting member and the poser; and a substantially-tubular light-tunnel extending between the said image-deflecting member and the said pose-reflecting member.

In testimony whereof, I have signed this specification.

LUTHER G. SIMJIAN.